June 28, 1932.     W. F. EGER     1,865,360

FISH BAIT

Filed Dec. 16, 1931

William F. Eger
INVENTOR

BY Victor J. Evans & Co.
ATTORNEY

Patented June 28, 1932

1,865,360

UNITED STATES PATENT OFFICE

WILLIAM F. EGER, OF BARTOW, FLORIDA

FISH BAIT

Application filed December 16, 1931. Serial No. 581,488.

My present invention has reference to an artificial bait and my object is to provide an artificial casting bait, which when drawn through the water or jerked on the surface of the water will travel on or near the water surface with the movement of a natural frog.

To the attainment of the foregoing the invention consists in the improvement hereinafter described and definitely claimed.

Figure 1:
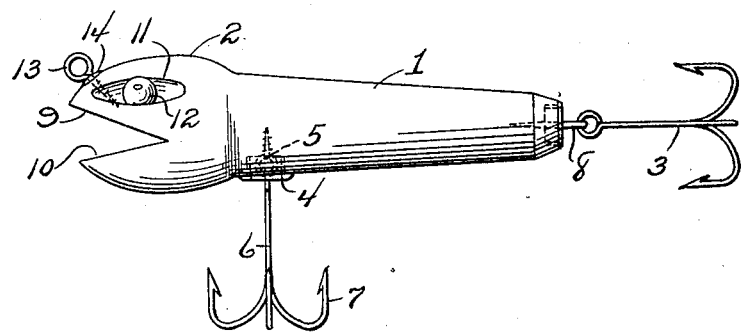
Figure 1 is a side elevation of the bait.
Figure 2:
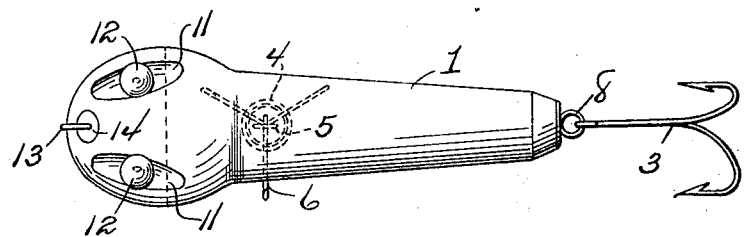
Figure 2 is a top plan view thereof.
Figure 3:
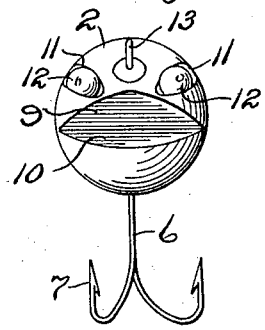
Figure 3 is a front elevation thereof.

The body of the bait may be of any desired buoyant material and has its outer surface coated with a preservative which prevents the same being water-logged, the said outer surface being differently colored in order to attract attention of fish.

The body 1 is tapered from the head 2 thereof and to the outer end of the tail of the body there is loosely connected hooks 3. The other face of the body, directly to the rear of the head has let thereinto an eyelet 4, and screwed in the body there is an eyelet whose eye end extends centrally through the eyelet. To this eye screw or bolt 5 there is connected the eye end on a shank provided with a plurality of hooks 7. The tail of the body also is preferably provided with an opening for an eyelet or short sleeve that receives therein a suitable plug in which the shank of a screw eye 8 is threaded, and to this screw eye there is connected the eye end of the shank for the hooks 3.

The head 2 is rounded upwardly and outwardly from its juncture with the body 1 and the outer end of the head is cut angularly to provide the same with a mouth. The upper wall 9 of the mouth projects a slight but suitable distance beyond the lower wall 10 thereof.

The sides of the head, above the upper wall of the mouth are channeled or grooved longitudinally, as at 11, the said grooves extending a slight upward angle, the end walls provided by the grooves being rounded as are the inner grooves.

In each of the grooves 11 there is secured the glass or like artificial eye 12, the eyes 12 being of a less thickness than the width of the grooves but being of a width to project beyond the grooves. Screwed angularly in the upper face of the head between the eyes and directly above the wall 9 of the mouth there is the shank of a screw eye 13, the eye contacting with a washer 14 and to the eye 13 the fishing line is attached.

By providing the head with the V-shaped mouth or slot in the widened head of the artificial bait the lower wall provided by this slot or mouth will be arranged near the surface of the water and as the head is substantially round in both plan, longitudinal and cross section the said head is more buoyant than the body, the body being weighted by the hooks attached thereto, which results in causing the lower jaw of the head to travel near the surface of the water. The buoyant head thus causes the bait to be arranged in the water at an angle of approximately 45° which resembles the natural position of a frog in the water. The head being enlarged and buoyant in reality serves as a pivot or fulcrum for the body, and a slight jerk on the line will cause a swinging or jerking movement of the bait upon its fulcrum head to produce a movement that closely resembles the movement of a frog. The frog-like splashing and the peculiar movement in the water caused by the mouth-like slot and the fluted eye sockets add further attention to the bait. The fluted eye sockets and the projecting eyes permit of the eyes being easily seen from any point of view and thereby render the bait a more enticing lure for any game fish. The fluted eye sockets with the mouth-like slot causes the bait when jerked through the water to almost perfectly imitate the natural movement of a frog while the hooks 3 and 7 are so spaced that they will not come in contact with each other, which is a defective feature in most baits of this character.

Having described the invention, I claim:

An artificial bait comprising a floatable body tapered from one end to the other and having its wide end integrally formed with an enlarged head which is substantially round in plan and in elevation, said head having a V-shaped slot entering from its outer end to provide a mouth and having its sides above the mouth fluted longitudinally at upward and rearward angles, artificial eyes in the said fluted portions projecting outwardly therefrom, hooks having their shanks swingably secured to the under face of the body at the juncture of the head thereof and other hooks having their shanks pivotally connected to the tail end of the body, together with an eye in the upper portion of the head for a fishing line.

In testimony whereof I affix my signature.

WILLIAM F. EGER.